Patented Aug. 18, 1936

2,051,782

UNITED STATES PATENT OFFICE 2,051,782

METHOD FOR DEHYDRATING PHENOLS AND MIXTURES CONTAINING PHENOLS

Kurt Buchheim and Curt Räth, Radebeul, near Dresden, Germany, assignors to Chemische Fabrik von Heyden, A. G., Radebeul, near Dresden, Germany, a corporation of Germany No Drawing. Application February 20, 1933, Serial No. 657,744. In Germany February 20, 1932

10 Claims. (Cl. 202—42)

This invention concerns an improvement in the manufacture of phenols and of similar products from chlorbenzene. More particularly this invention relates to a direct and simple process of producing phenols free of water.

Accordingly the prime object of this invention is to provide simple means for removing water and the like from phenols manufactured from chlorbenzene.

In converting chlorbenzene into phenol,—either by treating the chlorbenzene with steam in the presence of catalyzers or under heat by means of alkalies and under application of pressure,—we ordinarily obtain a mixture of the phenols with chlorbenzene, water and by-products of a higher boiling point. The extraction of the water is difficult because it is bound in the mixture, either by way of emulsion or by way of solution in respect to the phenolic ingredients.

It is one of the objects of this invention to liberate the water in such a mixture by the adjusting of the chlorbenzene contents, so that the water is readily liberated and completed removed by distillation.

In the manufacture of organic compounds such as acids, alcohols, etc., the azeotropic boiling point has been used before for the removal of undesirable ingredients, where such removal proved to be difficult otherwise because the boiling point of such ingredients was too close to that of the ingredients from which they were to be removed. Thus organic acids have been dehydrated by the use of chlorbenzene, in which instance the azeotropic boiling point of a mixture of the acid with the chlorbenzene facilitated the boiling off of said mixture, the water and other undesirable ingredients forming the residue.

In the manufacture of phenols a distillation taking advantage of azeotropic boiling points has not been resorted to, most particularly not in respect to the water, because the ordinary cause for such a step was not present, i. e., the boiling points of the ingredients to be separated from each other were not close together.

We have discovered that in the production of phenols from chlorbenzene, we can attain a clear separation of the water from the phenols by distillation, when the additional chlorbenzene is introduced in a proportion corresponding to the azeotropic boiling point of the water-chlorbenzene mixture. The particular advantage of such a method is, that we do not introduce new ingredients for the said purpose, but that we merely control the amount of one of the ordinarily present ingredients.

Chlorbenzene forms a mixture with water which has a constant boiling point of 91° centigrade, two parts of chlorbenzene distilling with one part of water.

The dehydration can be carried out in a known distilling apparatus with a column for continued or batch work, the former being preferable. E. g. the upper third of the column is fed with the liquid or mixture of liquids containing phenol and water, while at a point farther up the auxiliary liquid is fed, the azeotropic boiling point thus being maintained at the head of the column. The still then fills with a phenol or a mixture of phenols, which is completely free from any trace of water. If, due to any irregularity in the operation of the column, part of the auxiliary liquid should fall into the still, it may easily be removed from the column by adding a little water. The mixture of auxiliary liquid and water leaving the column at the head, is separated in a receiver according to the specific gravity, and the auxiliary liquid can be led back continuously to the column by an overflow.

In dealing with a mixture of phenols, water and organic solvents, we may generally proceed as follows; one of said organic solvents may be used as auxiliary liquid and the amount thereof is raised to a preferred ratio in relation to the undesirable ingredients, water for instance, by adding more of the solvent. In the case of a mixture consisting of water, phenol, chlorbenzene and diphenyl ether, as it occurs in the hydrolysis of chlorbenzene by alkalis under pressure, we use the chlorbenzene as auxiliary liquid.

Our improvements may be illustrated more precisely by way of the following example.

A mixture consisting of 70 parts by weight of phenol, 15 parts by weight of diphenyl ether, 5 parts by weight of chlorbenzene and 10 parts by weight of water is fed to the upper third of a continuously working column, chlorbenzene being added farther up so as to maintain the azeotropic boiling point of 91° C. Here all the chlorbenzene and all the water distils, while a mixture of phenol and diphenyl ether free from water and chlorbenzene remains in the still.

What we claim is:

1. In the removal of water from phenolic mixtures which may be obtained from the corresponding halogenated hydrocarbons by hydrolysis, the steps of dosing the halogenated hydrocarbon contents and the water contents in said mixture relatively to each other, so that an azeotropic ratio is maintained between said contents, and of distilling off the azeotropic mixture, so that said contents of halogenated hydrocarbon and of all water are driven off said phenolic mixture.

2. Preparing a phenol from a phenolic mixture containing said phenol, the halogenated hydrocarbon from which said phenol is derived and water, comprising the steps of increasing the halogenated hydrocarbon contents of said mixture so that all the water contained therein is removed by azeotropic distillation, distilling off the azeotropic mixture and distilling off the dehydrated phenol after such azeotropic distillation.

3. Recovering all the phenol free of water from a composition containing phenol and water by a single process, comprising distilling off the water at the azeotropic point of water and chlorbenzene, and introducing chlorbenzene during said distillation from time to time until all the water has been driven off.

4. Preparing a phenol from a mixture containing said phenol and water, comprising the introduction into said mixture of a halogenated hydrocarbon from which said phenol may be obtained by hydrolysis so that the content of said halogenated hydrocarbon exceeds the amount required for removing the water from said mixture by azeotropic distillation, an azeotropic distillation removing the water from said mixture, and the introduction into the residue of the water necessary to remove the remainder of said halogenated hydrocarbon by azeotropic distillation, so that all the water and all halogenated hydrocarbons are removed.

5. Preparing phenol from a mixture containing water, comprising the introduction into said mixture of chlorbenzene so that the content of chlorbenzene exceeds the amount required for removing the water from said mixture by azeotropic distillation, an azeotropic distillation removing the water from said mixture, and the introduction into the residue of the water necessary to remove the remainder of chlorbenzene by azeotropic distillation, so that all the water and all halogenated hydrocarbons are removed.

6. Preparing cresol from a mixture containing water, comprising the introduction into said mixture of toluene so that the content of toluene exceeds the amount required for removing the water from said mixture by azeotropic distillation, an azeotropic distillation removing the water from said mixture, and the introduction into the residue of the water necessary to remove the remainder of toluene by azeotropic distillation, so that all the water and all halogenated hydrocarbons are removed.

7. In the manufacture of phenol from chlorbenzene in which phenol, chlorbenzene, and water are comprised in an intermediate product, the steps of boiling off all the water from said product together with chlorbenzene at the azeotropic boiling point of a mixture of these two ingredients, and of introducing chlorbenzene from time to time during the boiling, in order to maintain the azeotropic chlorbenzene water ratio in said product.

8. In the manufacture of phenol from chlorbenzene in which phenol, chlorbenzene, water and bi-products of higher boiling points are obtained as an intermediate product, the steps of boiling off all the water from said product together with the chlorbenzene at the azeotropic boiling point of a mixture of these two ingredients, and of introducing additional chlorbenzene from time to time during said boiling in order to maintain the azeotropic chlorbenzene water ratio in said product.

9. In the manufacture of phenol from chlorbenzene in which phenol, chlorbenzene and water are comprised in an intermediate product in a distilling apparatus with a column, the steps of distilling water and chlorbenzene from said intermediate product, and of feeding chlorbenzene into the upper part of the column of the distilling apparatus during said distillation until all the water contained in said product has been distilled off together with chlorbenzene.

10. In the manufacture of phenol from chlorbenzene in which phenol, chlorbenzene, water and bi-products of higher boiling points are obtained as an intermediate product and placed in a distilling apparatus with a column, the steps of distilling water and chlorbenzene from said intermediate product, of feeding chlorbenzene into the upper part of the column of the apparatus used for the distillation, of separating the distillate according to specific gravity, and of reintroducing the chlorbenzene thus separated from the distillate into the upper part of the column during continued distillation until all the water has been removed.

KURT BUCHHEIM.
CURT RÄTH.